(12) United States Patent
Hoover et al.

(10) Patent No.: US 7,707,932 B1
(45) Date of Patent: May 4, 2010

(54) STAGGERED PLUNGER TAIL WITH IMPROVED WEAR SURFACE FOR A SMALL SQUARE BALER

(75) Inventors: Larry L. Hoover, Landisville, PA (US); Stephen W. Jacobs, Lititz, PA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 12/435,585

(22) Filed: May 5, 2009

(51) Int. Cl.
*B30B 1/00* (2006.01)
*B30B 15/06* (2006.01)

(52) U.S. Cl. ............... 100/179; 100/98 R; 100/215; 100/245; 100/295

(58) Field of Classification Search ............... 100/3, 100/7, 98 R, 179, 215, 218, 226, 240, 241, 100/245, 295; 56/341
See application file for complete search history.

(56) References Cited

U.S. PATENT DOCUMENTS

| | | | |
|---|---|---|---|
| 510,821 A * | 12/1893 | Sanders | 100/187 |
| 727,850 A | 5/1903 | Schubert | |
| 1,082,454 A * | 12/1913 | Swan | 100/240 |
| 1,988,497 A | 1/1935 | Jones | |
| 2,850,965 A | 9/1958 | Soteropulos | |
| 3,211,193 A | 10/1965 | Anderson | |
| 4,013,181 A | 3/1977 | Johnson | |
| 5,351,613 A * | 10/1994 | Newsom | 100/98 R |
| 5,642,662 A | 7/1997 | Schwelling | |
| 6,289,798 B1 | 9/2001 | Van Der Hyde | |
| 6,837,158 B2 * | 1/2005 | Simpson | 100/245 |
| 2005/0056165 A1 * | 3/2005 | Roth | 100/179 |

FOREIGN PATENT DOCUMENTS

| | | |
|---|---|---|
| EP | 311764 A1 | 4/1989 |
| FR | 2630680 A1 | 11/1989 |
| GB | 2055072 A | 2/1981 |

* cited by examiner

*Primary Examiner*—Jimmy T Nguyen
(74) *Attorney, Agent, or Firm*—Patrick M. Sheldrake; John William Stader; Michael G. Harms

(57) ABSTRACT

An improved mechanism for controlling the orientation of a plunger in a bale chamber of a small square baler that positions the lower plunger tail guide further from the working surface of the plunger than the upper plunger tail guide in order to better resist the rocking forces of the plunger in the bale chamber thereby improving the capability of the plunger guides to maintain proper plunger knife clearances and improving the durability of the bearing materials in the plunger guides.

20 Claims, 3 Drawing Sheets

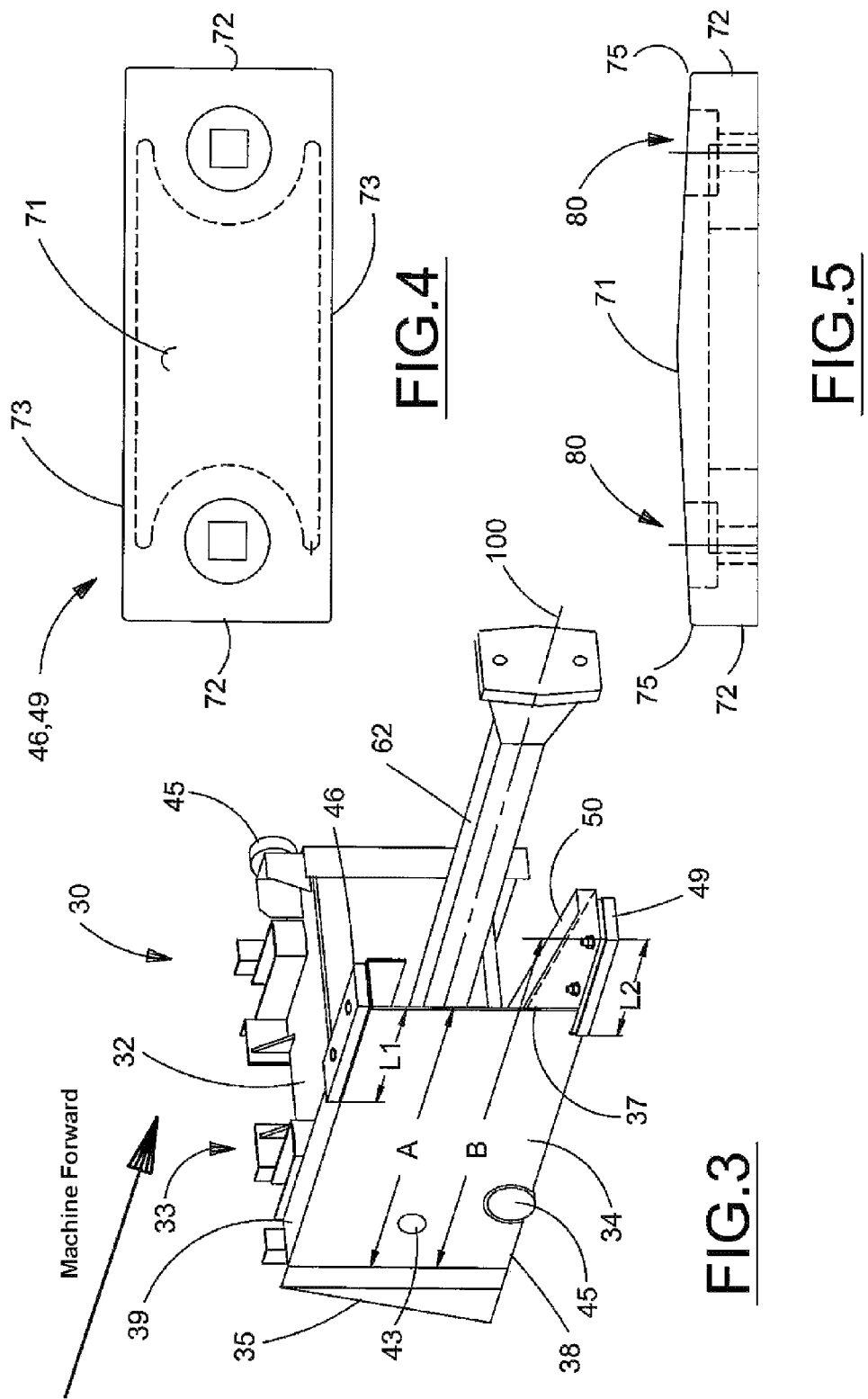

STAGGERED PLUNGER TAIL WITH IMPROVED WEAR SURFACE FOR A SMALL SQUARE BALER

BACKGROUND OF THE INVENTION

This invention relates generally to agricultural balers of the type commonly referred to as square balers that produce bales having a rectangular cross section, and more particularly to an improved plunger guide apparatus that increases stability of plunger movement in the bale chamber and improves the of the plunger mechanism.

Square balers are implements that pick up a swath or windrow of crop material, such as straw or hay, from the ground and deposit it in an infeed housing where it is conveyed by a feed mechanism through an inlet to a bale forming chamber. Four walls define the bale forming chamber where the crop material is urged rearwardly by a reciprocating plunger to form a rectangular package of compacted crop material. Knives positioned on the plunger sever the crop material at the juncture of the bale chamber and the crop inlet as the plunger passes so that the plunger may urge the crop material rearwardly in the bale chamber to form the compressed crop package in the rearward end of the bale forming chamber. The package so formed is automatically tied by a tying mechanism to complete the bale that is then discharged from the chamber by being urged rearwardly by the next bale being successively formed. Completed bales are either deposited on the ground for subsequent retrieval or they are delivered by appropriate means to a trailing wagon hitched to the back of the baler.

The plunger is guided within the bale chamber by rollers and sliding guide (slider) blocks which keep the working surface of the plunger perpendicularly aligned with the walls of the bale chamber. Maintaining plunger alignment is crucial to maintaining knife clearances necessary to assure proper and efficient operation of the square baler. Pressure for increased efficiency in agricultural operations has led to simplified plunger designs. Plunger tail length along the reciprocating axis has been decreased and cam bearings have been replaced with slider blocks formed from wear-resistant materials to simplify the plunger design. Such improvements in production efficiency have not been without consequence. Over time, such simplified designs have proven to lack the desired adjustment longevity and durability needed to satisfy ever-increasing customer demands. Reductions in plunger tail length have resulted in reductions in the durability of the slider blocks with a corresponding adverse affect on the ability to maintain the plunger knife settings.

It would be a great advantage to provide an improved bale plunger guide design which would improve guide control of a reciprocating plunger in a bale chamber and increase the durability of the slider blocks thereby improving the operational performance and service interval in a small square baler thereby overcoming the above problems and disadvantages. Still further advantages would be realized by providing an improved design for the plunger guide that utilizes many of the production efficiencies previously incorporated into the plunger design while improving plunger movement control.

SUMMARY OF THE INVENTION

Accordingly, the present invention, in any of the embodiments described herein, may provide one or more of the following advantages:

It is an object of the present invention to provide an improved guide mechanism for the plunger in a small square baler that improves the reliability and durability of the guide mechanism.

It is a further object of the present invention to provide an improved guide mechanism for the plunger in a small square baler that increases the length of the bottom plunger tail in order to increase the bearing surface and thus increase durability. This object is obtained though increases of the lower plunger tail alone thereby avoiding the additional production costs of increasing the upper plunger tail length.

It is a further object of the present invention to provide an improved mechanism for controlling the movement of a reciprocating plunger in a bale forming chamber that utilizes specifically contoured slider blocks configured to eliminate the drawbacks of using slider blocks in an "as-cast" condition.

It is a further object of the present invention to extend the separation of the bottom plunger slider block from the plunger face compared to the top plunger slider block in order to increase the service interval of the plunger guide mechanism and plunger knife adjustment and to improve the control of the plunger orientation in the bale chamber as the plunger reciprocates.

It is a further object of the present invention to extend the separation of the bottom plunger slider block from the plunger face by approximately 35% compared to the top plunger slider block in order to equalize the service life expectancies of the top and bottom slider blocks.

It is a still further object of the present invention to lengthen the bottom cast slider block by 30% compared to the upper slider block in order to increase the wear surface provided by the slider block and to accommodate the increased sliding forces to which the lower guide sliders are subjected compared to the upper sliders.

It is a still further object of the present invention to provide an improved plunger guide mechanism that retains the production benefits of a simplified plunger design while improving its operational performance.

It is a still further object of the present invention to provide an improved plunger guide mechanism for controlling the motion of a plunger in a small square baler that is durable in construction, inexpensive of manufacture, carefree of maintenance, easily assembled, and simple and effective to use.

These and other objects are achieved by providing an improved mechanism for controlling the orientation of a plunger in a bale chamber of a small square baler that positions the lower plunger tail guide further from the working surface of the plunger than the upper plunger tail guide in order to better resist the rocking forces of the plunger in the bale chamber thereby improving the capability of the plunger guides to maintain proper plunger knife clearances and improving the durability of the bearing materials in the plunger guides.

BRIEF DESCRIPTION OF THE DRAWINGS

The advantages of this invention will be apparent upon consideration of the following detailed disclosure of the invention, especially when taken in conjunction with the accompanying drawings wherein.

FIG. 3 is a partial perspective view of a plunger, plunger tail, and connecting rod typically used in a small square baler showing one embodiment of the present invention;

FIG. 4 presents a plan view of a slider block embodying the present invention; and FIG. 5 presents a side elevation view of the slider block shown in FIG. 4.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
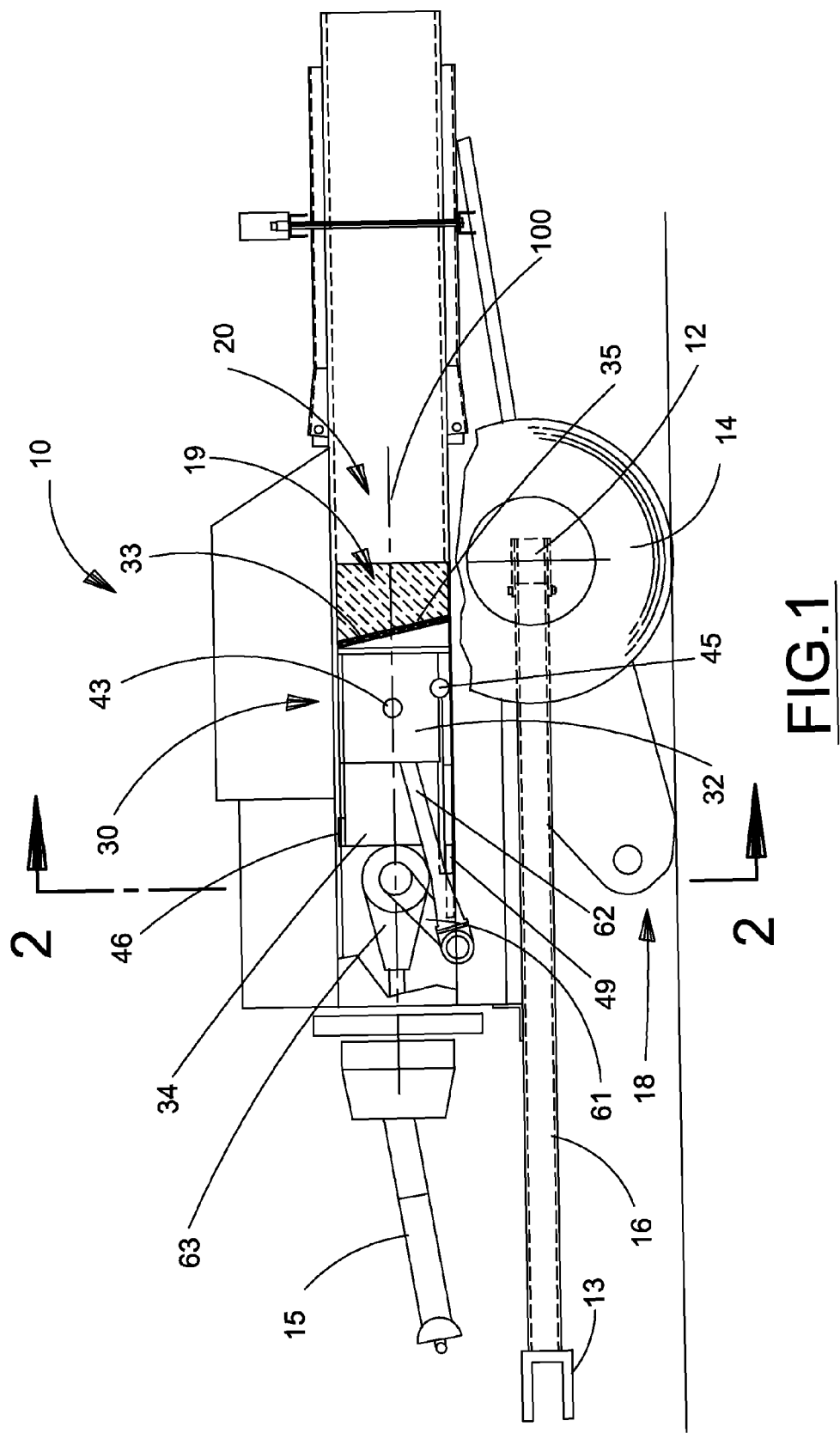
FIG. 1 is a side view of a typical small square baler having a reciprocating plunger of the type on which the present invention is useful.

FIG. 1 shows a baler 10 for producing oblong bales having generally rectangular cross-sections of less than or equal to 16 inches by 18 inches, generally referred to as small, square bales. The baler 10 includes a frame 12 that is ground-supported by wheels 14 (only one shown). A tongue 16 projects forwardly from the frame 12 and is configured for connection by a hitch 13 to a towing vehicle, such as an agricultural tractor (not shown). A power take-off shaft 15 delivers motive power from the tractor to the various driven components in the baler 10. A pick-up 18 is provided in order to take up a swath or windrow of harvested crop from the ground and to deliver it toward a bale chamber 20 through a crop inlet opening 19 located in the inboard side wall of the bale chamber. Bale chamber 20 is an elongate, open structure generally horizontally arranged along a longitudinal bale travel axis 100 within the baler 10. The bale chamber 20 has a generally rectangular cross sectional area that establishes the bale size when viewed along axis 100. A plunger 30 is reciprocally disposed in the bale chamber 20 to urge crop material delivered from the pick-up 18 rearwardly in the bale chamber to form the crop material into square bales in a conventional manner. Reciprocal motion of the plunger is caused by a rotating crankshaft 61 and a connecting rod 62 interconnecting the crankshaft and the plunger through a connecting pin 43 in a well-known manner. A gearbox 63 or other functionally equivalent means may be used to convert the rotation of the power take-off shaft 15 to rotation of the crankshaft 61 at a desired speed. The formed square bales are urged sequentially through the bale chamber 20 by motion of the plunger 30, bound with a suitable material such as twine, and then discharged from the baler 10.

Figure 2:
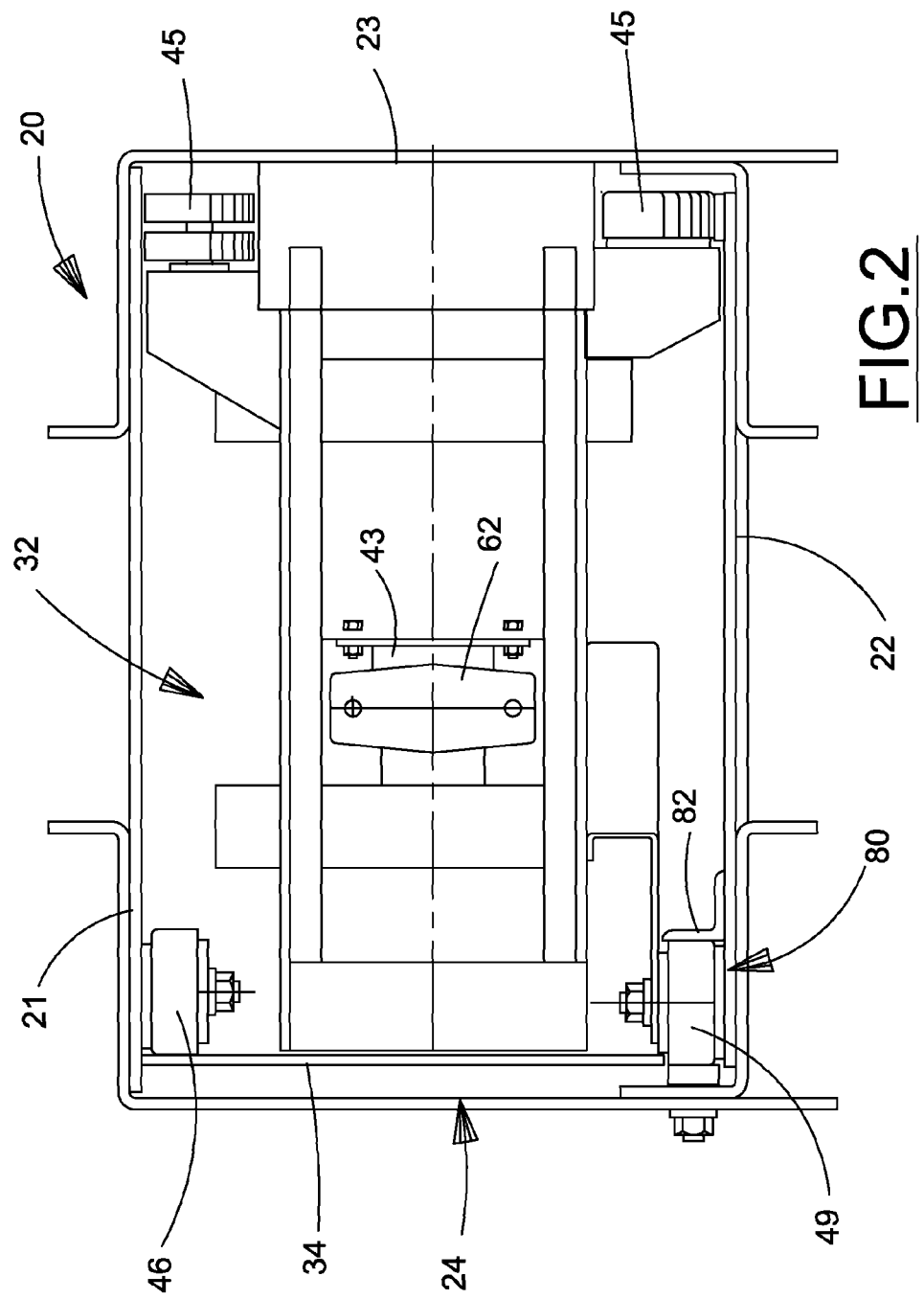
FIG. 2 shows an section view of the bale chamber of the small square baler shown in FIG. 1 taken along line 2-2 looking rearwardly into the plunger showing the relationship of the plunger, bale chamber walls, and the slider blocks of the present invention.

Referring now to FIGS. 1 and 2, the bale case 20 is further defined by a pair of generally opposing and parallel upper and lower walls 21, 22, respectively, what are spaced apart by a pair of generally opposing inboard and outboard side walls 23, 24, respectively, to form a generally rectangular opening through which bales pass forwardly to rearwardly along bale travel axis 100. The rectangular shape of bale case 20 generally establishes the cross-sectional rectangular size of the bale, typically on the order of 16 by 18 inches. The bale chamber walls 21, 22, 23, 24 are typically fixed, but may include provisions for adjusting the size of the bale case.

Plunger 30 is further comprised of a head structure 32 having a working face 33 for interacting with crop material that is oriented generally perpendicularly to the axis 100 of the bale chamber and rearwardly facing as assembled in the baler. Head structure 32 features a plurality of guide rollers 45 and sliding guide (slider) blocks 46, 49 which engage interior surfaces of the bale chamber walls to maintain proper spacing between plunger and the bale chamber walls as the plunger reciprocates. Proper plunger alignment is critical to maintain the relationship between knife 35 and the inlet opening 19 so that crop material at the inlet opening will be cleanly severed by the knife 35 as the plunger 30 moves rearwardly. A generally planar curtain structure 34, referred to hereinafter as the plunger tail, extends forwardly from head structure 32 from a position adjacent to knife 35 for a sufficient length so that crop inlet 19 is covered by plunger tail 34 when the plunger is in the rearwardmost position of its travel. As the plunger 30 moves rearwardly in the bale chamber to compress a crop charge, the plunger tail 34 covers the crop inlet opening 19 to prevent crop material entry into the bale chamber on the connection (non-working) side of the plunger 30. Plunger tail 34 vertically spans the height of the bale chamber to the extent necessary to allow the plunger tail 34 to cover inlet opening 19 yet provide sufficient space between the upper and lower walls 21, 22 so that the plunger may reciprocate. Plunger tail 34 is thus vertically bounded by a bottom edge 38 and a top edge 39 that are spaced apart slightly less than the vertical height of the bale chamber 20. Production efficiency is obtained by providing an extended plunger tail only on the side adjacent to the side wall having the crop inlet.

Additional control of the plunger orientation within the bale chamber is provided by the inclusion of upper and lower sliders 46, 49 respectively, which are positioned at the top edge 39 and bottom edge 38 of the plunger tail adjacent to the forwardmost end 37 of the plunger tail 34. Upper slider 46 engages a portion of the upper wall 21 where it limits the upward displacement of the plunger. In one embodiment, a lower guide channel 80 is provided for engagement by lower slider 49 so that downward and lateral displacement is limited. Inward lateral movement of the lower slider 49 is resisted by a vertical guide rail 82, which may include provisions for adjustment for refining the alignment of the plunger guides. The forward displacement of the upper and lower guides 46, 49 from the location of connecting pin 43 provides a torque resistant guide which reduces "rocking" of the plunger in the bale chamber. Plunger "rocking" is defined as deflections from the normal perpendicular orientation to the bale chamber axis 100. The tendency for such deflections is inherent in the design of crankshaft-driven reciprocating slider apparatus such as the present baler plunger.

Now referring to FIG. 3, wherein one embodiment of the present invention is shown to improve the ability of the plunger guide to reduce plunger rocking during baler operation thereby improving reliability of the plunger apparatus and further improving knife alignment. In this embodiment, the lower slider block 49 has been further displaced from the working face 33 of the plunger than the upper slider block 46 by the incorporating an extension structure 50 to the lower edge of the plunger tail 34. Offsetting the upper and lower slider blocks relative to the working face results in a plunger having greater resistance to rocking without requiring the entire plunger tail structure to be lengthened. In operation, greater forces are applied on the lower slider block 49 than on the upper slider block; by lengthening the lower moment arm (displacement from working face 33), the forces between the slider blocks and the bale chamber walls can be equalized to improve service life of the slider blocks. These are shown in FIG. 3 as dimensions "A" for the upper slider block displacement, and "B" for the lower slider block displacement. Improved plunger guidance is realized with any measurable increase in the lower slider block displacement, but is optimized by maximizing the increase within the confines of the bale chamber length. In the preferred embodiment, the lower slider block displacement "B" is approximately 35% greater than the upper slider block displacement "A."

Still further improvement in the plunger guide is achieved by increasing the wearing surface area of the lower slider block 49 compared to the upper slider block 46. One method for increasing the relative surface area is to lengthen the block along the axis of travel, Finally referring to FIGS. 4 and 5 wherein details of the upper slider block 46 and lower slider block 49 are shown. As the slider blocks are similar in design with the exception of their respective lengths, shown as L1 and L2 in FIG. 3, the following description applies to both and a common identification of the elements of the slider blocks is presented. Slider blocks 46, 49 each comprise an opposing pair of side extensions 73 and an opposing pair of end extensions 72 configured to form a generally rectangular perimeter of a bearing surface 71 when view in plan. Side and end extensions are disposed generally perpendicularly to the bearing surface such that the sliders are generally shaped as rectangular parallelepipeds. The transition between the side and end extensions 72, 73 and the bearing surface is radiused 75 to eliminate any sharp discontinuities on or adjacent to bearing surface 71. Furthermore, bearing surface 71 is contoured to a slightly convex profile along its length to further reduce the likelihood that a sharp edge on the slider block will be in contact with a sliding surface in the bale chamber. The degree of the convex contour is sufficient to accommodate material shrinkage that occurs during formation of cast parts, such as the cast iron material typically used in the slider blocks of the present invention. The bearing surfaces of prior known sliders having a flat bearing surface in the casting mold are often slightly concave due to material shrinkage occurring during the post-casting cooling process. The slider blocks are attached to the plunger structure using well-known techniques, such as bolting using holes 80 as shown. It is noted that the connection means must be recessed to avoid protrusion above the bearing surface 71.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. In an agricultural baler including an elongate bale case defined by rectangularly arranged walls, the bale case having a crop inlet opening formed in one of the walls; a feeder mechanism communicating with the bale case through the inlet opening for charges of crop material to be transferred from the feeder mechanism into the bale case; a plunger reciprocable along an axis within the bale case to compress successive charges of crop material received from the feeder mechanism to form a bale, the plunger further having a generally rectangular cross section; the improvement therein comprising:
   a generally rectangular plunger head having a working face being oriented generally perpendicularly to said axis, said working surface being bounded by generally opposing and parallel upper and lower edges, and generally opposing and parallel inner and outer edges oriented generally perpendicularly to said upper and lower edges;
   a generally planar plunger tail connected to said plunger head adjacent to and extending from said inner edge in a first direction generally parallel to said axis for a first extension to a terminal end, said plunger tail having a top edge and a bottom edge, said top and bottom edges aligned parallel to said axis, said plunger tail further configured to reciprocally control entry of crop material through the inlet opening;
   an upper slider block connected to said top edge of said plunger tail adjacent to said terminal end, said upper slider block configured to slidingly engage an upper wall of the bale case;
   a tail extension connected to said plunger tail adjacent to said terminal end and said bottom edge, said tail extension extending therefrom in said first direction for a second extension to a tail end, wherein said second extension is longer than said first extension; and
   a lower slider block connected to said tail extension and configured to slidingly engage a lower wall of the bale case opposite of said upper wall.

2. The improvement as described in claim 1, wherein said upper and lower slider blocks each have a bearing surface configured for sliding engagement with respective said bale case walls.

3. The improvement as described in claim 2, wherein said second bale case wall further comprises a guide rail perpendicularly extending from said second bale case wall and aligned parallel to said axis to form a guide channel, and said lower slider block further comprises a plurality of side extensions oriented generally perpendicularly to said bearing surface wherein one of said side extensions is configured to slidingly engage said guide rail simultaneously as said lower slider block bearing surface engages said second bale case wall.

4. The improvement as described in claim 3, wherein said bearing surfaces of said upper and said lower slider blocks are convexly contoured.

5. The improvement as described in claim 4, wherein said upper and said lower slider blocks are configured generally as rectangular parallelepipeds and further comprise a radiused contour connecting said bearing surfaces of said upper slider block and said lower slider block respectively.

6. The improvement as described in claim 5, wherein said upper slider block has an first length in a direction parallel to said axis and said lower slider block has a second length in a direction parallel to said axis and said second length is greater than said first length.

7. The improvement as described in claim 1, wherein said second extension is approximately 35 percent longer than said first extension.

8. The improvement as described in claim 6, wherein said second length is approximately 30 percent greater than said first length.

9. In an agricultural baler including an elongate bale case having generally parallel and opposing upper and lower walls separated by a pair of spaced apart and opposing side walls; a crop inlet opening in one of said side walls, a feeder mechanism communicating with the bale case through the inlet opening for charges of crop material to be transferred from the feeder mechanism into the bale case; a plunger reciprocable along an axis within the bale case to compress successive charges of crop material received from the feeder mechanism to form a bale, the plunger further having a generally rectangular cross section; the improvement therein comprising:

a plunger head having a generally rectangular and planar working face bounded by a perimeter configured to fit with the bale case, said working face being aligned generally perpendicularly to the axis;

a generally planar plunger tail connected to said plunger head and extending therefrom in a first direction generally parallel to the axis for a first extension to a terminal end, said plunger tail having a top edge and a bottom edge, said top and bottom edges aligned parallel to said axis, said plunger tail aligned generally parallel and adjacent to the bale case inlet opening and further configured to reciprocally control entry of crop material through the inlet opening;

a tail extension connected to said plunger tail adjacent to said terminal end and said bottom edge, said tail extension extending therefrom in said first direction for a second extension to a tail end, wherein said second extension is longer than said first extension;

an upper slider block connected to said top edge, said upper slider block having a bearing surface with an upper length in the direction of said axis and configured for sliding engagement with said upper wall, said upper slider block bearing surface being convexly contoured; and a lower slider block connected to said tail extension, said lower slider block having a bearing surface with a lower length in the direction of said axis and configured for sliding engagement with said lower wall, said lower slider block bearing surface being convexly contoured and wherein said lower slider block length is greater than said upper slider block length to compensate for increased wear forces on said lower slider block compared to said upper slider block.

10. The improvement as described in claim 9, further comprising an elongate lower guide disposed on the lower wall opposite adjacent to said side wall in which said inlet opening is located and aligned parallel to said axis, said lower guide configured to laterally restrain said lower slider block movement.

11. The improvement as described in claim 10, wherein said upper and said lower slider blocks are configured generally as rectangular parallelepipeds and further comprise a radiused contour connecting said bearing surfaces of said upper slider block and said lower slider block respectively.

12. The improvement as described in claim 11, wherein said lower slider block length is approximately 30 percent greater than said upper slider block length.

13. The improvement as described in claim 9, wherein said second extension is approximately 35 percent longer than said first extension.

14. In an agricultural baler including an elongate bale case having generally parallel and opposing upper and lower walls separated by a pair of spaced apart and opposing side walls; a crop inlet opening in one of said side walls, a feeder mechanism communicating with the bale case through the inlet opening for charges of crop material to be transferred from the feeder mechanism into the bale case; a plunger reciprocable along an axis within the bale case to compress successive charges of crop material received from the feeder mechanism to form a bale, the plunger further having a generally rectangular cross section; the improvement in the plunger therein comprising:

a plunger head having a generally rectangular and planar working face bounded by a perimeter configured to fit with the bale case, said working face being aligned generally perpendicularly to the axis;

a generally planar plunger tail connected to said plunger head and extending therefrom in a first direction generally parallel to the axis for a first extension to a terminal end, said plunger tail having a top edge and a bottom edge, said top and bottom edges aligned parallel to said axis, said plunger tail aligned generally parallel and adjacent to the bale case inlet opening and further configured to reciprocally control entry of crop material through the inlet opening;

an upper slider block connected to said top edge adjacent to said terminal end configured to slidingly engage said upper wall;

a tail extension connected to said plunger tail adjacent to said terminal end and said bottom edge, said tail extension extending therefrom in said first direction for a second extension to a tail end, wherein said second extension is longer than said first extension; and a lower slider block connected to said tail extension and configured to slidingly engage said lower wall wherein said lower slider block is further displaced from said plunger head than said upper slider block thereby improving the capability of the plunger alignment in the bale case to be maintained.

15. The improvement as described in claim 14, wherein said lower slider block is approximately 35 percent further displaced from said plunger head than said upper slider block.

16. The improvement as described in claim 15, wherein said lower slider block engages a guide rail perpendicularly extending from said lower wall in parallel alignment to said axis to form a guide channel, and said lower slider block further comprises a plurality of side extensions oriented generally perpendicularly to said bearing surface wherein one of said side extensions is configured to slidingly engage said guide rail simultaneously as said lower slider block bearing surface engages said lower wall.

17. The improvement as described in claim 16, wherein said bearing surfaces of said upper and said lower slider blocks are convexly contoured.

18. The improvement as described in claim 17, wherein said upper slider block has a first length in a direction parallel to said axis and said lower slider block has a second length in a direction parallel to said axis and said second length is greater than said first length.

19. The improvement as described in claim 18, wherein said second length is approximately 30 percent greater than said first length.

20. The improvement as described in claim 19, wherein said upper and said lower slider blocks are configured generally as rectangular parallelepipeds and further comprise a radiused contour connecting said bearing surfaces of said upper slider block and said lower slider block respectively.

* * * * *